US010621411B2

(12) United States Patent
Schlaudraff et al.

(10) Patent No.: US 10,621,411 B2
(45) Date of Patent: Apr. 14, 2020

(54) METHOD FOR LASER MICRODISSECTION

(71) Applicant: Leica Microsystems CMS GmbH, Wetzlar (DE)

(72) Inventors: Falk Schlaudraff, Butzbach (DE); Andrew Lee, Allen, TX (US); Florian Hoffmann, Giessen (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1030 days.

(21) Appl. No.: 14/599,659

(22) Filed: Jan. 19, 2015

(65) Prior Publication Data

US 2016/0210498 A1    Jul. 21, 2016

(51) Int. Cl.
| | |
|---|---|
| *G06K 9/00* | (2006.01) |
| *G02B 21/06* | (2006.01) |
| *G02B 21/36* | (2006.01) |
| *G02B 21/32* | (2006.01) |
| *G01N 1/28* | (2006.01) |

(52) U.S. Cl.
CPC ......... *G06K 9/00127* (2013.01); *G01N 1/286* (2013.01); *G02B 21/06* (2013.01); *G02B 21/32* (2013.01); *G02B 21/365* (2013.01); *G01N 2001/2886* (2013.01)

(58) Field of Classification Search
CPC ...... G01N 1/04; G01N 1/06; G01N 2001/065; G01N 2001/068; G06K 9/00127
See application file for complete search history.

(56) References Cited

U.S. PATENT DOCUMENTS

| | | | |
|---|---|---|---|
| 2003/0133190 A1 | 7/2003 | Weiss | |
| 2004/0093166 A1* | 5/2004 | Kil | ............ G01N 1/06 702/19 |
| 2004/0252291 A1 | 12/2004 | Schutze | |
| 2006/0139621 A1 | 6/2006 | Baer et al. | |
| 2007/0066967 A1* | 3/2007 | Sieckmann | .......... G01N 1/2813 606/10 |
| 2008/0194011 A1 | 8/2008 | Wesner | |

(Continued)

FOREIGN PATENT DOCUMENTS

| | | |
|---|---|---|
| DE | 102004062218 A1 | 7/2006 |
| DE | 102013209880 A1 | 12/2014 |
| EP | 1276586 B1 | 1/2003 |

(Continued)

*Primary Examiner* — Jill A Warden
(74) *Attorney, Agent, or Firm* — Leydig, Voit & Mayer, Ltd.

(57) ABSTRACT

A method for laser microdissection includes detecting at least a portion of an object to be dissected in an image-producing manner in a laser microdissection system and generating a first digital object image. A first processing specification is defined based on the first digital object image. In a first processing step, the object is processed using a laser beam of the laser microdissection system in accordance with the first processing specification. At least a portion of the object is detected in an image-producing manner and a second digital object image is generated. A second processing specification is defined during execution of the first processing step based on the second digital object image. In a second processing step, the object is processed using the laser beam of the laser microdissection system in accordance with the second processing specification.

10 Claims, 2 Drawing Sheets

(56) References Cited

U.S. PATENT DOCUMENTS

2011/0194749 A1* 8/2011 Morris ................... G01N 1/286
                                                    382/133
2012/0045790 A1* 2/2012 Van Dijk .............. G06T 7/0014
                                                    435/29

FOREIGN PATENT DOCUMENTS

| WO | WO 03036266 A1 | 5/2003 |
| WO | WO 2005040762 A1 | 5/2005 |
| WO | WO 2006134142 A1 | 12/2006 |

* cited by examiner

METHOD FOR LASER MICRODISSECTION

FIELD

The present invention relates to a method for laser microdissection and to a laser microdissection system configured for carrying out the method.

BACKGROUND

Methods for processing biological specimens by laser microdissection have existed since the mid-1970s and have been continually refined since then.

In laser microdissection, cells, tissue regions, and so forth can be isolated from an object to be dissected by a laser beam and recovered as so-called "dissectates." A particular advantage of laser microdissection is the brief contact between the object and the laser beam, causing very little modification to the object. Specific recovery of the dissectates can be accomplished in a variety of ways.

In known methods, for example, a dissectate can be isolated from an object by means of an infrared or ultraviolet laser beam; the dissectate falls in response to gravity into a suitable dissectate collection container. The dissectate can also be excised from the object together with an adhering membrane. In "laser capture microdissection," on the other hand, a thermoplastic membrane is heated by means of a corresponding laser beam; the membrane fuses with the desired region of the object and can be removed in a subsequent step by tearing. A further alternative consists in attaching the dissectate, by means of the laser beam, to a cover of a dissectate collection container. With known inverted microscope systems for laser microdissection, dissectates catapulted upward can also be attached to the bottom of a dissectate collection container which is equipped with an adhesive coating.

In laser microdissection, processing of the objects very seldom occurs entirely manually. It is typical in microdissection that the object to be dissected is captured in image-producing manner, preferably digitally, and displayed e.g. on a monitor. As is known in principle, a user can, by means of a user interaction unit, for example by means of a PC system, define on a correspondingly reproduced object image a cutting line specification along which a laser microdissection is to be performed. It is also possible, however, to evaluate corresponding object images entirely automatically, for example using known contrast detection methods and/or pattern recognition methods, so that cutting line specifications can be defined automatically. Reference is made, for example, to WO 2005/040762 A1 for details. When the "defining of a processing specification" on the basis of an object image is discussed in the context of embodiments of the present invention hereinafter, both possibilities are to be encompassed by the wording. The object to be dissected is then dissected in accordance with the processing specification, for example a manual cutting line specification, that has been defined.

The principal disadvantage of the method discussed above, i.e. the respectively alternating definition of processing specifications, for example manual cutting line specifications, and subsequent processing, is in particular the large expenditure of time associated therewith. Cutting line specification by a user often requires appreciably more time than the subsequent actual laser microdissection. The same also applies to automatic methods, since the detailed image evaluation necessary for this requires considerable time even in modern evaluation systems.

SUMMARY

In an embodiment, the present invention provides a method for laser microdissection. At least a portion of an object to be dissected is detected in an image-producing manner in a laser microdissection system and a first digital object image is generated. A first processing specification is defined based on the first digital object image. In a first processing step, the object is processed using a laser beam of the laser microdissection system in accordance with the first processing specification. At least a portion of the object is detected in an image-producing manner and a second digital object image is generated. A second processing specification is defined during execution of the first processing step based on the second digital object image. In a second processing step, the object is processed using the laser beam of the laser microdissection system in accordance with the second processing specification.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
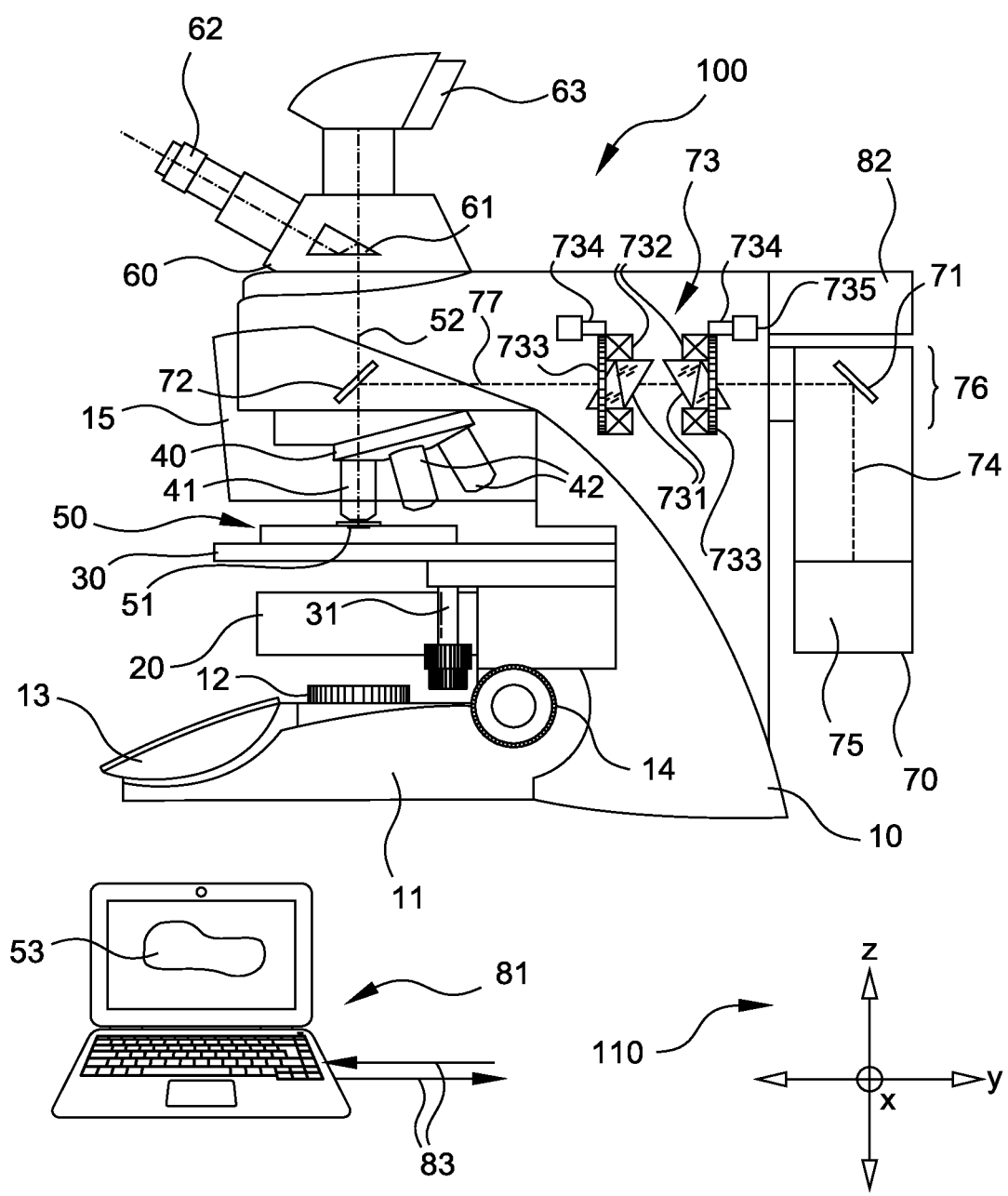
FIG. 1 shows a laser microdissection system with which a method according to an embodiment of the present invention can be executed.
Figure 2:
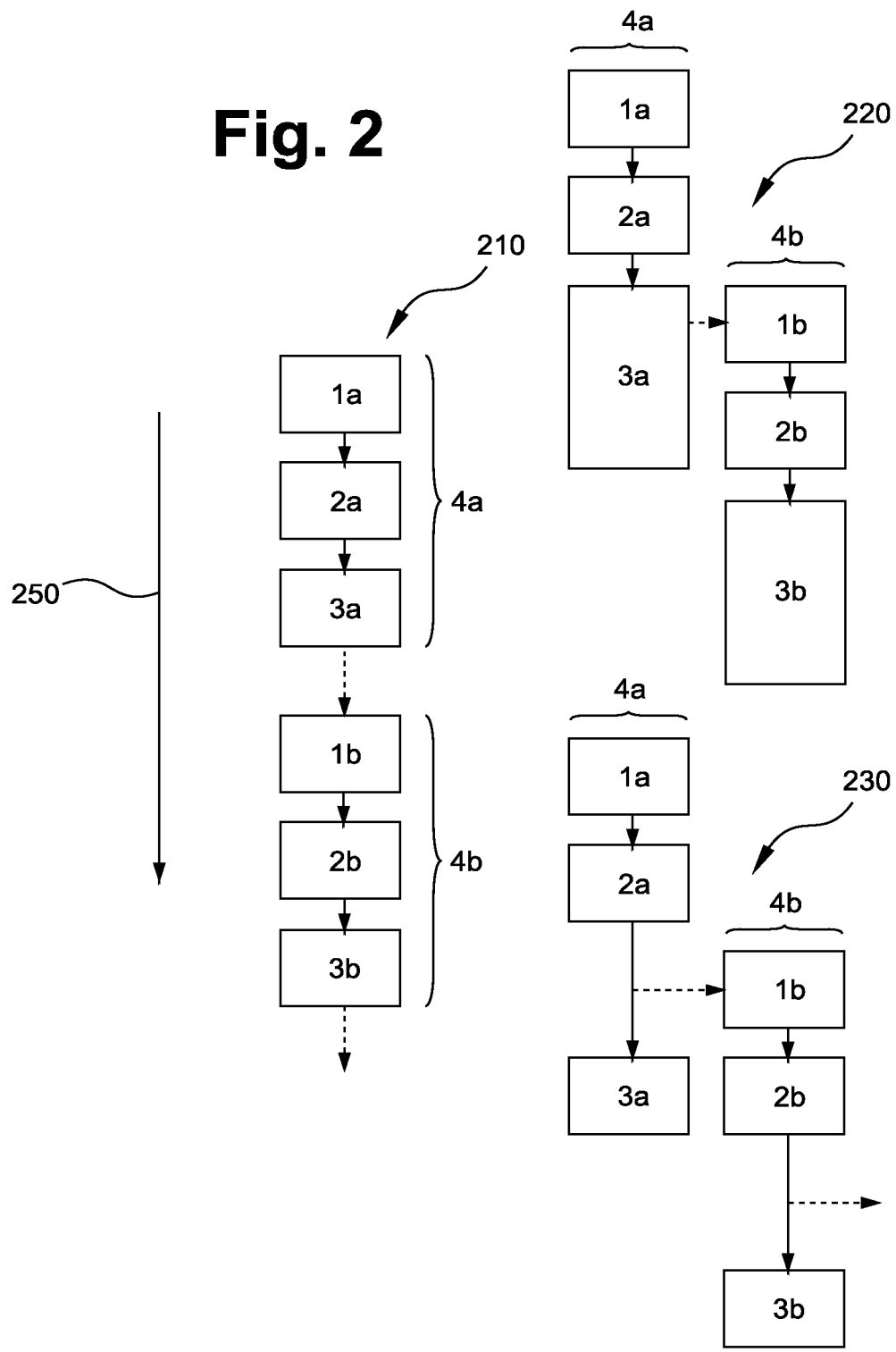
FIG. 2 illustrates the method according to an embodiment of the present invention as compared with methods according to the existing art.

Referring to FIGS. 1 and 2 an embodiment of a method (220, 230) for laser microdissection and a laser microdissection system for very rapid excision of dissectates are illustrated. At least a portion of an object (51) to be dissected is detected in an image-producing manner (1a) in a laser microdissection system (100) accompanied by generation of a first digital object image (53); a first processing specification is defined (2a) on the basis of the first digital object image (53); and the object (51) is then, by means of a laser beam (74) of the laser microdissection system (100), processed (3a) in a first processing step in accordance with the first processing specification. According to an embodiment of the present invention, at least a portion of the object (51) is detected in an image-producing manner (1b) accompanied by generation of a second digital object image (53); during execution of the first processing step a second processing specification is defined (2b) on the basis of the second digital object image (53); and the object (51) is then, by means of the laser beam (74) of the laser microdissection system (100), processed (3b) in a second processing step in accordance with the second processing specification. Processing specifications can be stipulated on real-time images while cutting of the object is already contemporaneously occurring.

An embodiment of the present invention is suitable in particular for those methods in which a dissectate is detached from an object and collected in a dissectate collection container arranged thereabove or therebelow. This embodiment is therefore particularly suitable for noncontact laser microdissection methods.

In an embodiment, the present invention improves the known methods for laser microdissection in such a way that the processing and recovery of objects to be dissected is appreciably accelerated.

An embodiment of the present invention provides a method for laser microdissection in which at least a portion of an object to be dissected is detected in an image-producing manner in a laser microdissection system accompanied by generation of a first digital object image; a first processing specification is defined as explained above on the basis of the first digital object image; and the object is then, by means of a laser beam of the laser microdissection system, processed in a first processing step in accordance with the first processing specification. As explained, the definition of a processing specification encompasses both manual definition of a cutting line specification, for example on a monitor by means of a user interaction unit, and fully automatic definition of cutting line specifications, for example based on pattern recognition methods or contrast detection methods.

Provision is made according to an embodiment of the present invention that at least a portion of the object is detected in an image-producing manner accompanied by generation of a second digital object image; during execution of the first processing step a second processing specification is defined on the basis of the second digital object image; and the object is then, by means of the laser beam, processed in a second processing step in accordance with the second processing specification. In other words, an embodiment of the invention therefore proposes that the previously alternatingly performed definition of the processing specifications and subsequent processing of the object be at least partly parallelized. According to the present invention, the time that is spent in a first processing step for processing a corresponding object is respectively available for defining new processing specifications for a subsequent processing step. The laser microdissection system can comprise for this purpose a control unit having a control software program, which is configured to contemporaneously control the execution of the first processing step and at the same time permit input of the second processing specification. This results in appreciably faster processing of the objects. This advantage is perceptible in particular when many dissectates need to be cut out of one object, for example in a laboratory in which the dissectates are required for subsequent processing, e.g. PCR preparation (PCR=polymerase chain reaction).

Although "first" and "second" object images, processing specifications, and processing steps are discussed herein, in the context of a method according to embodiments of the present invention it is of course possible for any number of further additional digital object images to be generated, processing specifications to be defined, and processing steps to be carried out contemporaneously. Advantageously, a new processing specification used for the subsequent processing step is defined contemporaneously during all further processing steps except for a final processing step. When it is stated here and hereinafter that "a" processing specification is defined, this can of course also encompass the marking or definition of multiple cutting line specifications, as well as the settings for laser focus and laser energy.

In a particularly advantageous embodiment of the method, the second digital object image is generated as a real-time object image. This has the advantage for the user that processing proceeds particularly quickly, since the second digital object image does not need to be stored. New processing specifications can thus be stipulated based on real-time images while cutting of the object in accordance with the previous processing specifications is already contemporaneously occurring.

Known microscope systems that are configured for laser microdissection comprise an incident light device into whose beam path a laser beam is coupled in. The laser beam is focused by the respectively utilized microscope objective onto the object, which rests on a motor-driven microscope stage. A cutting line is generated by displacing the microscope stage upon cutting, in order to move the object relative to the stationary laser beam. In laser microdissection systems of this kind, the object cannot readily be viewed during the dissecting operation, i.e. during a processing step, since the object is moving in the field of view and thus appears unfocused. Embodiments of the present invention can also be used in these microscope systems for laser microdissection, i.e. in methods, in which for processing, the object is displaced with respect to the stationary laser beam by means of a displaceable microscope stage. In this case, the second digital object image is advantageously generated, based on the limitations explained, after the object has previously been processed in the first processing step and before the object is then processed in the second processing step. A digital object image is thus generated between the two processing steps and is advantageously temporarily stored and, during the second processing step, evaluated manually or automatically.

In the context of generation of the digital object image, the respectively established stage position can, for example, also be temporarily stored. In other words, advantageously a position of the displaceable microscope stage upon generation of the second digital object image is stored, and that position is employed for processing the object in the second processing step.

The digital object image generated after the first and before the second processing step can then, for example, be used to define further cutting line specifications, or very generally to define further processing specifications, which can subsequently, by comparison of the previously temporarily stored stage position with digital image coordinates, also be further used for processing in the second processing step.

A particular advantage of this method is that in this case cutting line specifications defined e.g. in a digital image are always brought, by a movement of the microscope stage, into the center of the field of view prior to the subsequent processing step.

Laser microdissection systems that comprise laser deflection or laser scanning devices, which are configured to direct the laser beam or its impact point over the stationary object, can be more advantageous in the context of an embodiment of the present invention. Laser microdissection systems of this kind are explained in detail below with reference to FIG. 1. A particularly advantageous laser microdissection system that comprises a laser scanning device having mutually displaceable glass wedges in the laser beam path is described, for example, in EP 1 276 586 B1.

In other words, it can also be advantageous in the context of an embodiment of the present invention to displace the laser beam with respect to the stationary object by means of a laser scanning device for processing of the object. This makes it possible, particularly advantageously, to generate the second object image while the object is simultaneously being processed in the first processing step. Here the object is stationary in the field of view of the objective, and can be viewed even during processing.

A significant advantage of a correspondingly directable laser beam and of the object static with respect to the laser beam is the possibility of defining, for example, at least one further cutting line specification in a currently depicted digital object image that corresponds to the current field of view, which can then be used, after completion of the respective processing step currently being carried out, to guide the laser beam in a subsequent processing step. A corresponding embodiment of the method according to the present invention thus allows maximum acceleration of the overall processing procedure by parallelization of processing steps and subsequent processing specifications.

In both cases, i.e. both in laser microdissection systems in which the microscope stage is displaced and in laser microdissection systems that comprise a laser scanning device, it is usual to work with pulsed lasers, a small hole in the object being generated by each laser pulse. A dissectate is generated by sequence of such holes, optionally with a corresponding overlap.

Laser microdissection can be used to extract individual cells or defined tissue regions, i.e. dissectates of nucleic-acid-containing objects. Such dissectates can then be subjected to various analysis methods, for example in molecular biology.

As repeatedly explained, definition of the processing specifications in the context of the present invention can advantageously encompass manual definition by a user of a cutting line specification, as a processing specification, on the object images that are presented for that purpose to the user, for example on a screen. The cutting line can be specified on the object images in a fundamentally known manner, for example with a user interaction unit utilizing a mouse, a touchscreen, or another pointing device.

As also explained, however, definition of the processing specifications can also encompass detecting objects in the object images by means of an automatic image analysis and automatically defining the processing specifications on that basis. These can likewise be cutting line specifications that are used for processing.

The method according to an embodiment of the present invention proves to be particularly advantageous in the latter case, since typically a not inconsiderable processing time is required for automatic image analysis. Processing time can be saved by partial parallelization, i.e. by performing corresponding steps during a previously performed processing step. This proves to be advantageous in particular because objects for laser microdissection are typically sensitive, and contents to be analyzed degrade over time and can thus cause lower quality results as a result of a correspondingly tedious process. The automatic detection method can in particular encompass successively evaluating at least two respective sub-regions of the object images, for example scanning corresponding object images in respective sub-regions.

The laser microdissection system likewise provided according to an embodiment of the present invention encompasses an image detecting device configured to generate a first digital object image by image-producing detecting of at least a portion of an object to be dissected, a specifying device configured to define a first processing specification on the basis of the first object image, and a processing unit configured to process the object, by means of a laser beam of the laser microdissection system, in a first processing step in accordance with the first processing specification.

According to an embodiment of the present invention, provision is made in a laser microdissection system of this kind that the image detecting device is configured to generate a second digital object image by image-producing detecting of at least a portion of the object to be dissected;

the specifying device is configured to define a second processing specification, during execution of the first processing step, on the basis of the second digital object image, and the processing unit is configured to then process the object, by means of the laser beam of the laser microdissection system, in a second processing step.

In a further embodiment, a laser microdissection system of this kind comprises an image detecting device configured to generate the second digital object image as a real-time object image. New processing specifications can thus be stipulated on real-time images, while cutting of the object in accordance with the previous processing specifications is already contemporaneously occurring. A digital camera is preferably provided as the image detecting device.

In a further embodiment, the laser microdissection system comprises a specifying device configured to receive an input of a user in order to define therefrom a first processing specification on the basis of the first object image.

A laser microdissection system of this kind alternatively or additionally comprises a specifying device configured to receive an input of a software program or of an image processing system in order to define therefrom a first processing specification on the basis of the first object image.

In a preferred embodiment of the invention, an external user interaction unit is provided as a specifying device. This unit can be embodied exclusively as an input device, for example a digitizing tablet. A computer can also be provided, however, as a specifying device.

A preferred laser microdissection system furthermore comprises a control unit that monitors the input of processing specifications and controls the execution of processing steps.

In a further preferred embodiment, the laser microdissection system comprises as a specifying device a computer as well as a control unit, a software program being installed in the control unit and/or in the computer and being executable thereon so as to monitor the input of processing specifications and to control the execution of processing steps contemporaneously with the input of processing specifications.

In the laser microdissection system, the processing specification is, for example, the arrangement of a laser cutting line on the object, and/or at least one parameter for setting an energy of the laser beam, and/or at least one parameter for setting optical and/or motorized components of the laser microdissection system.

A corresponding laser microdissection system advantageously comprises in particular devices and structures that are configured for carrying out the various embodiments of the method according to the present invention which have been explained above. Reference is therefore expressly made to the features and advantages previously explained.

In FIG. 1 a laser microdissection system that can be used to carry out a method according to a embodiment of the present invention is depicted schematically and labeled 100 in its entirety. Laser microdissection system 100 corresponds in essential parts to the one disclosed in EP 1 276 586 B1, to which reference is expressly made here. A coordinate system on the basis of which axes X, Y, and Z are illustrated is labeled 110. The X axis extends perpendicularly to the drawing plane.

Laser microdissection system 100 encompasses a microscope 10. An illumination device 12 is provided in a microscope base 11 of microscope 10. This device can encompass, for example, a light source and means, for example filters and/or diaphragms, for influencing the illuminating light furnished by the light source.

A user input unit and/or user information unit 13, which can be embodied e.g. as a touchscreen and by way of which the user can, for example, input and/or read out viewing and/or processing parameters, is also arranged on microscope base 11. It is also possible, however, to arrange a user input unit and/or user information unit separately from the microscope stand, for example as a computer 81 having a display or as a control unit.

A drive knob 14 is also provided. This serves for operation of a coarse drive and fine drive for adjusting a height of a microscope stage 30. An object 51, which is located on a specimen slide on a sample holder 50, for example a thin tissue section of a biological specimen mounted on a specimen slide, can thereby be brought into a plane of focus of an objective 41. Objective 41 is mounted, in addition to further objectives 42, in an objective turret 40. A protective hood 15 can be provided in order to protect a user from laser radiation. A condenser unit 20 serves for transmitted illumination of object 51 and for the setting of suitable contrast methods and observation methods.

Observation light proceeding from object 51 proceeds along an observation beam path 52. In a tube unit 60 having suitable outcoupling devices 61, a preferably variable proportion of the observation light can be outcoupled, for example through 60°, and can be presented to a user by means of an eyepiece pair 62. A further proportion of the observation light can be coupled into a digital image detecting unit 63 and detected in image-producing manner in digital image detecting unit 63.

Laser microdissection system 100 comprises a laser unit 70 having a laser light source 75. A laser beam 74, generated from laser light source 75 which can be, for example, a UV laser light source, is deflected in an incident light unit (indicated here in its entirety with the reference character 76) at a first deflection mirror 71 and a second deflection mirror 72, and is focused through objective 41 onto object 51.

With laser microdissection system 100, the location at which laser beam 74 strikes object 51 can in principle be adjusted in different ways. On the one hand a manual displacement device 31 can be provided, by means of which microscope stage 30, embodied as a cross-slide stage, can be displaced in an X and a Y direction (i.e. here respectively perpendicular and parallel to the plane of the paper). Besides displacement device 31, an electromechanical positioning device can also be provided, which for example can have control applied to them by a control unit 82 and whose position can be detected by control unit 82.

Control unit 82 can also control any number of further motorized functions of laser microdissection system 100. Said unit is connected via an interface to an external user interaction unit 81, for example to a PC system, via corresponding connections 83. User interaction unit 81 and/or control unit 82 are configured in particular as devices for applying control to specimen stage 30, to sample holder 50, and/or to image detecting unit 63. Installed on control unit 82 and/or on user interaction unit 81 is a control software program with which they are configured to carry out processing steps and to define processing specifications and control the sequence thereof over time. In the example depicted, a digital object image 53 of object 51 is presented to a user on user interaction unit 81. By means of user interaction unit 81 the user can, for example by means of a mouse, define a processing specification according to which object 51 is then processed. This can be, for example, setting of the laser focus and/or laser energy, as well as specification of the desired cutting line on object 51. It is also possible, however, to select a location on object 51 by marking in the digital object image 53, so that the latter can be processed in another manner with laser beam 74.

A laser scanning device 73 can, however, in particular be provided for laser microdissection in incident light unit 76. By means of laser scanning device 73, laser beam 74 can also be deflected with respect to an optical axis 77 extending between first deflection mirror 71 and second deflection mirror 72. The laser beam can therefore strike different lateral positions on second deflection mirror 72, which can be embodied e.g. as a dichroic splitter, and is thus also focused onto object 51 at different positions. Corresponding deflection by means of a laser scanning device 73 is shown in detail in EP 1 276 586 B1. It is emphasized that a variety of possibilities for deflecting a laser beam or for positioning object 51 with respect to laser beam 74 can be utilized. The invention is not limited to the example depicted.

In the example depicted, laser scanning device 73 comprises two solid glass wedge plates 731 that are tilted with respect to optical axis 77 and are rotatable mutually independently around optical axis 77. Wedge plates 731 are mounted for this purpose using ball bearings 732. Each of the wedge plates is connected to a gear 733. Gears 733 can each be rotated by means of rotation devices 734. Rotation devices 734 can have a rotary motion imparted to them manually and/or by means of suitable electromechanical apparatuses, for example by means of stepping motors, and can thereby drive gears 733. Rotation devices 734 can possess position transducers 735 (shown here only on the right-hand rotation device 734). A position thereby detected can be conveyed to control unit 82.

FIG. 2 illustrates comparatively, in the form of schematic flow charts, a method in accordance with the existing art and two different embodiments of the method corresponding to the present invention. A method in accordance with the present invention is labeled 210, and two methods in accordance with the invention are labeled 220 and 230. In methods 210 to 230, the steps in the processing of a microscopic object, for example of object 51 depicted in FIG. 1, by means of laser microdissection system 100 are illustrated with the respective identical reference characters 1a to 3a and 1b to 3b. The corresponding steps constitute processing sequences that are illustrated respectively in the FIGS. as 4a and 4b. Steps 1a to 3a are part of a first processing sequence 4a, i.e. "first" steps; steps 2b to 3b are part of a second processing sequence 4b, i.e. "second" steps. Processing sequences 4a and 4b and their corresponding steps 3a and 1b are linked to one another with dashed arrows. A time axis valid for all the methods is labeled 250.

In methods 210 to 230, a respective step of generating an object image of at least a portion of a microscopic object to be processed by means of laser microdissection method 210 to 230, for example of object 51, is respectively labeled 1a and 1b. Step 2a or 2b respectively designates the definition of processing specifications on the basis of a corresponding object image, for example, the delineation of cutting line specifications on a user interaction unit, for example on user interaction unit 81 according to FIG. 1, and/or the automatic definition of cutting line specifications by means of pattern recognition methods or object detection methods. Step 3a or 3b respectively designates the processing of a corresponding object 51, for example of object 51, by means of a laser beam, for example cutting by means of a laser beam 54 of a laser microdissection system 100 in accordance with FIG. 1.

As is evident from a consideration of method 210, in conventional methods for laser microdissection in accordance with the existing art the aforesaid steps 1a to 3a and 1b to 3b proceed sequentially.

Method 220 according to an embodiment of the invention, conversely, is partly parallelized. Method 220 is utilized in laser microdissection systems 100, such as those which are shown in FIG. 1 and which possess a laser scanning device 73, so that a further digital object image can be generated during processing step 3. It is therefore possible to perform the respective previously explained steps 1b and 2b, namely the generation of a digital object image and definition of a processing specification, during a processing step 3a. For method 220, processing sequences 4a and 4b are illustrated next to one another and partly in parallel.

In method 230 according to a further embodiment of the invention, which is used in particular in laser microdissection systems having a stationary laser beam and movable specimen stage, after definition of the processing specifications and before the actual processing in processing sequence 4a, i.e. between the steps 2a and 3a illustrated in FIG. 2 with respect to method 230, according to step 1b a further digital object image is generated and is used in the next processing sequence 4b for definition of the processing specifications in accordance with step 2b.

It is understood that in all of the methods shown, the processing sequences 4b that are shown can each be followed by any number of further processing sequences 4x having corresponding steps 1x to 2x.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 Laser microdissection system
110 Coordinate system
10 Microscope
11 Microscope base
12 Illumination device
13 User input unit and/or user information unit
14 Drive knob
15 Protective hood
20 Condenser unit
30 Microscope stage
31 Manual X-Y displacement device
40 Objective turret
41 Objective
42 Further objectives
50 Sample holder
51 Object
52 Observation beam path
53 Digital object image
60 Tube unit
61 Outcoupling devices
62 Eyepiece pair
63 Digital image detecting unit
70 Laser unit
71 First deflection mirror
72 Second deflection mirror
73 Laser scanning device
731 Glass wedge plates
732 Ball bearing
733 Gear
734 Rotation devices
735 Position transducer
74 Laser beam
75 Laser light source
76 Incident light unit
77 Optical axis
81 External user interaction unit
82 Control unit
83 Connections
210 Method in accordance with the existing art
220, 230 Methods in accordance with the invention
250 Time axis
1a to 3a Processing steps of a first processing sequence 4a
1b to 3b Processing steps of a second processing sequence 4b
4a, 4b Processing sequences (encompassing processing steps)

What is claimed is:

1. A method for laser microdissection, the method comprising:
   detecting at least a first portion of an object to be dissected in an image-producing manner in a laser microdissection system and generating a first digital object image;
   defining a first processing specification based on the first digital object image;
   processing the object, in a first processing step in accordance with the first processing specification, using a laser beam of the laser microdissection system;
   detecting at least a second portion of the object in an image-producing manner and generating a second digital object image;

defining a second processing specification, during execution of the first processing step, based on the second digital object image; and processing the object, in a second processing step in accordance with the second processing specification, using the laser beam of the laser microdissection system.

2. The method according to claim 1, wherein the second digital object image is generated as a real-time object image.

3. The method according to claim 1, wherein, during the first and second processing steps, the object is displaced with respect to the laser beam, which is stationary, using a displaceable microscope stage.

4. The method according to claim 3, further comprising storing a position of the displaceable microscope stage upon generation of the second digital object image and using the position for processing the object in the second processing step.

5. The method according to claim 1, wherein, during the first and second processing steps, the laser beam is displaced with respect to the object, which is stationary, using a laser scanning device.

6. The method according to claim 4, wherein the second object image is generated while the object is being processed in the first processing step.

7. The method according to claim 1, wherein the processing specifications include a cutting line specification which is defined manually by a user.

8. The method according to claim 1, wherein the processing specifications include a cutting line specification defined using an automatic detection method.

9. The method according to claim 8, wherein the automatic detection method comprises successively evaluating at least two respective sub-regions of the digital object images.

10. The method according to claim 1, wherein the second object image is generated while the object is being processed in the first processing step.

* * * * *